(12) United States Patent
Stanesic et al.

(10) Patent No.: US 6,381,806 B1
(45) Date of Patent: May 7, 2002

(54) RETAINER ASSEMBLY FOR POSITIVE RETENTION OF FLOOR MAT

(75) Inventors: J. Matthew Stanesic, West Chester; Raymond O. Sherman, Fairfield, both of OH (US)

(73) Assignee: Nifty Products, Inc., Hamilton, OH (US)

(*) Notice: Subject to any disclaimer, the term of this patent is extended or adjusted under 35 U.S.C. 154(b) by 0 days.

(21) Appl. No.: 09/758,277

(22) Filed: Jan. 12, 2001

(51) Int. Cl.[7] ............................................. A47G 27/04
(52) U.S. Cl. .................. 16/4; 16/6; 24/90.5; 411/431; 411/372.6; 411/377
(58) Field of Search ........................... 16/4, 6, 8, 17.1; 24/90.5; 411/431, 372.5, 372.6, 373, 377, 910; 296/97.23; 428/99, 100

(56) References Cited

U.S. PATENT DOCUMENTS

| | | |
|---|---|---|
| 1,691,013 A | 11/1928 | Johnson |
| 1,766,204 A | 6/1930 | Waldes |
| 2,109,402 A | 2/1938 | Place |
| 2,210,799 A | 8/1940 | Denny |
| 4,214,505 A * | 7/1980 | Aimar ........................ 24/350 |
| 4,358,874 A | 11/1982 | Kaiser |
| 4,392,279 A | 7/1983 | Schwager |
| 4,406,033 A | 9/1983 | Chisholm et al. |
| 4,561,146 A | 12/1985 | Schaty |
| 4,829,627 A | 5/1989 | Altus et al. |
| 4,918,791 A | 4/1990 | Hardin |
| 5,332,347 A * | 7/1994 | Kimisawa .................. 411/182 |
| 5,621,951 A | 4/1997 | Gould |
| 5,666,691 A | 9/1997 | Bealing |
| 5,775,859 A | 7/1998 | Anscher |
| 6,009,562 A | 1/2000 | Bullock et al. |
| 6,264,413 B1 * | 7/2001 | Bisping et al. ............... 411/15 |

* cited by examiner

Primary Examiner—Chuck Y. Mah
(74) Attorney, Agent, or Firm—Charles R. Wilson

(57) ABSTRACT

A two piece retainer assembly is used for positive retention of an associated vehicular floor mat to the vehicle's floor surface. The retainer assembly works in conjunction with a hook-like fastener permanently mounted to the vehicle's floor surface. The two piece retainer assembly comprises (a) an annular collar for positioning in a hole in the floor mat from an underside, and (b) a locking cover coupler for positioning in the hole of the floor mat from an upper side. The annular collar and locking cover coupler are forced together to trap the floor mat. The annular collar has a vertical upwardly extending wall forming an opening and a horizontally radially extending flange connected to the vertical wall. The locking cover coupler has a base plate with a vertical downwardly extending wall forming an opening and dimensioned to receive the vertical upwardly extending wall of the annular collar in frictional engagement. At least two vertically extending latching tabs extend from the base plate. The locking cover coupler further has a cap hinged to the base plate. The cap includes an interior locking wall and at least two recessed slots. The assembly of the invention as installed on the floor mat is positioned over the hook-like fastener in the vehicle's floor. The hook-like fastener extends through the openings of the annular collar and the base plate and is trapped in place when the cap is closed down onto the base plate.

17 Claims, 3 Drawing Sheets

RETAINER ASSEMBLY FOR POSITIVE RETENTION OF FLOOR MAT

FIELD OF THE INVENTION

This invention relates to a retainer assembly for use with a motor vehicle floor mat. More particularly, the invention relates to a two piece retainer assembly for positive retention of the floor mat to the vehicle's floor to prevent movement of the floor mat during use.

BACKGROUND OF THE INVENTION

Floor mats have long been used in motor vehicles to protect an underlying carpeted floor surface. The carpet is basically a one piece molded carpet which covers the entire interior area of the vehicle. It is permanently installed and meant to last the life of the vehicle. Most vehicle owners, particularly owners of non-commercial vehicles such as autos, vans and SUV's realize that the molded carpet is likely to be soiled and want to protect the carpet.

Early versions of floor mats for use in vehicles were typically no more than another piece of carpet cut to fit a defined area of the carpeted floor surface and overlie it. Such floor mats were easy to position and could readily be replaced when overly soiled. However, such floor mats tended to slide on the carpet floor. This created a nuisance to the vehicle's driver and passengers and a safety hazard to the driver if the sliding floor mat interfered with use of the vehicle's accelerator and/or brake. Subsequent versions of floor mats used anti-skid means to alleviate any floor mat sliding, particularly on the driver side. These anti-skid means included projecting nubs, hook-like fasteners such as Velcro and other means, typically placed on the floor mat's underside. A likelihood of sliding of the floor mat during use was substantially reduced, but not eliminated.

Current needs require that the floor mat, at least when used on the driver side of the vehicle must have positive retention. That is, movement of the floor mat is secured to the vehicle floor surface in a manner where substantial movement is not possible. Attempts to meet this requirement have included fasteners which are attached to the floor of the vehicle and interact with the floor mat. One common example is a hook-like fastener having two legs at right angles to one another. A terminus of one leg is screwed into the floor. The other leg hooks into a grommeted hole in the floor mat. When properly installed, the floor mat cannot be slid laterally. A limited amount of sliding is permitted by the tolerances needed in making the hole in the floor mat large enough to receive the hook-like fastener.

In accord with the demands of the auto industry in particular, there is still a need for a retention system for a floor mat to hold it in place with minimal chance for sliding movements. Understandably, any retention system must be easy to install and dependable. It also must permit the vehicle's owner to periodically remove the floor mat for cleaning purposes without excessive effort. In response to this need, there has now been developed a retainer assembly for a floor mat which fulfills the demands of a positive retention system. The assembly makes use of currently installed hook-like fasteners found on many vehicles. The assembly of the invention is economically produced and installed onto floor mats. The floor mat is then installed on the hook-like fastener by the vehicle's owner.

SUMMARY OF THE INVENTION

A two piece retainer assembly is intended for installation on a vehicular floor mat and for use with a hook-like fastener permanently mounted to the vehicle's floor surface. The retainer assembly provides positive retention of the floor mat during use. The two piece retainer assembly comprises (a) an annular collar for positioning in a hole in the floor mat from an underside thereof, and (b) a locking cover coupler for positioning in the hole of the floor mat from a upper side. The annular collar has a vertical upwardly extending wall forming an opening and a horizontally radially extending flange connected to the vertical wall. The locking cover coupler has a base plate with a vertical downwardly extending wall forming an opening and dimensioned to receive the vertical upwardly extending wall of the annular collar in frictional engagement. The base plate also has at least two vertically extending latching tabs. The locking cover coupler further has a cap hinged to the base plate. The cap has a hollow interior formed by an exterior wall and includes a locking wall extending across the hollow interior wall. The cap further has at least two recessed slots to receive the latching tabs of the base plate. The two piece retainer assembly is positioned on the floor mat with the annular collar and the base plate of the locking cover coupler coupled together. In use, the assembly of the invention as installed on the floor mat is positioned over the hook-like fastener in the vehicle's floor. The hook-like fastener extends through the openings of the annular collar and base plate and is trapped in place when the cap is closed down onto the base plate.

DETAILED DESCRIPTION OF THE INVENTION

The two piece retainer assembly of the invention is particularly adapted for installation on a vehicle floor mat and for interacting with a hook-like fastener permanently secured to a floor of the vehicle. It can be used elsewhere, but finds its most popular use on vehicular floor mats and for this reason is described below in this context.

Figure 1:
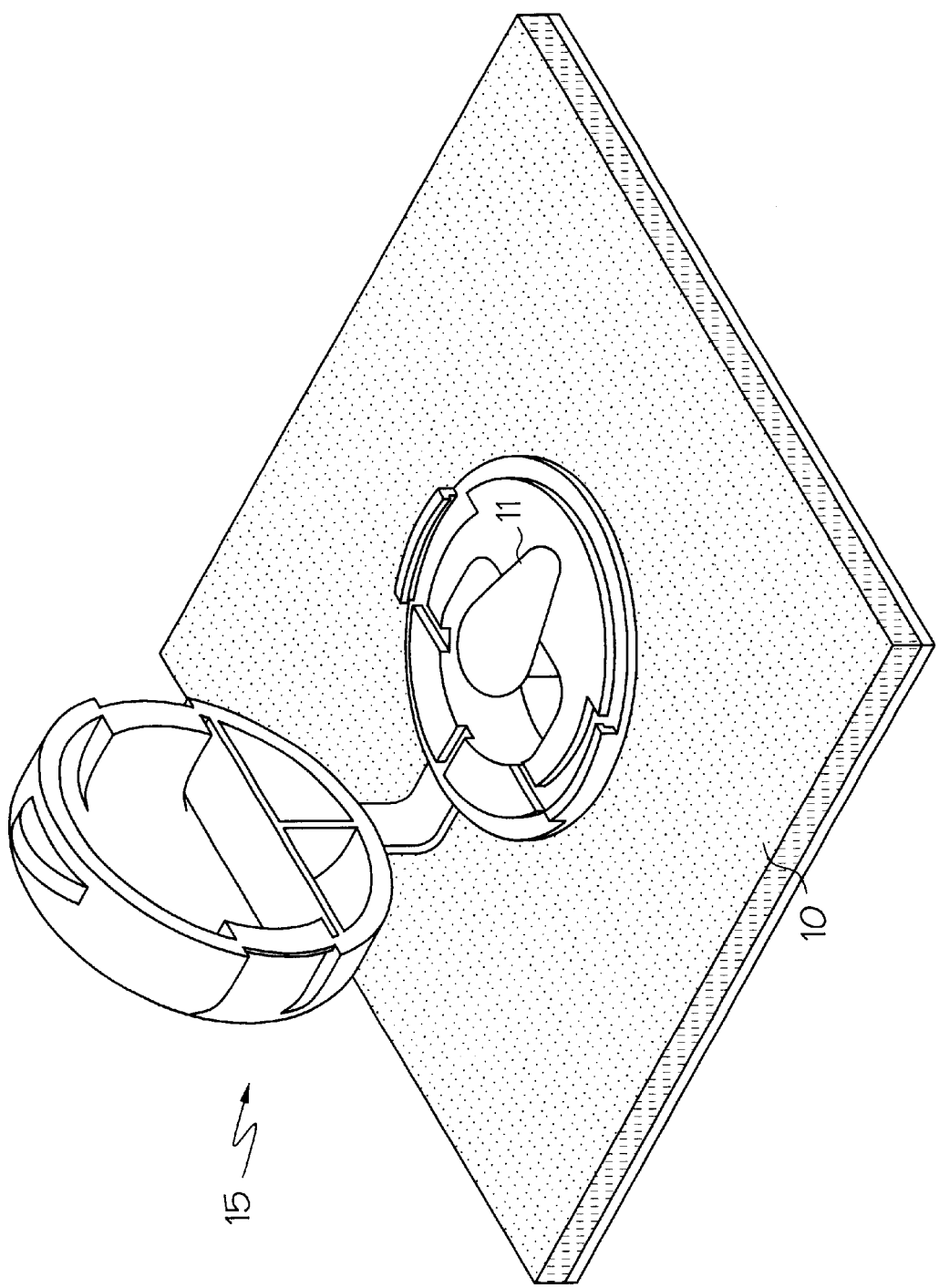
FIG. 1 is a perspective view of the two piece retainer assembly of the invention showing its installation on a section of floor mat with a hook-like fastener extending from a floor surface and through openings in the retainer assembly.

With reference to FIG. 1, there is shown in perspective a portion of a floor mat 10 and a hook-like fastener 11. The floor mat itself is conventional. It includes a molded thermoplastic backing and a carpet topside. While not apparent from the drawings, the floor mat 10 for use with the two piece retainer assembly of this invention further includes a hole extending fully through the carpet and the backing. The hole is near at least one corner of the floor mat positioned such that in use of the floor mat, the hole will be directly over the hook-like fastener. The hook-like fastener 11 is permanently secured to a floor of the vehicle.

Figure 2:
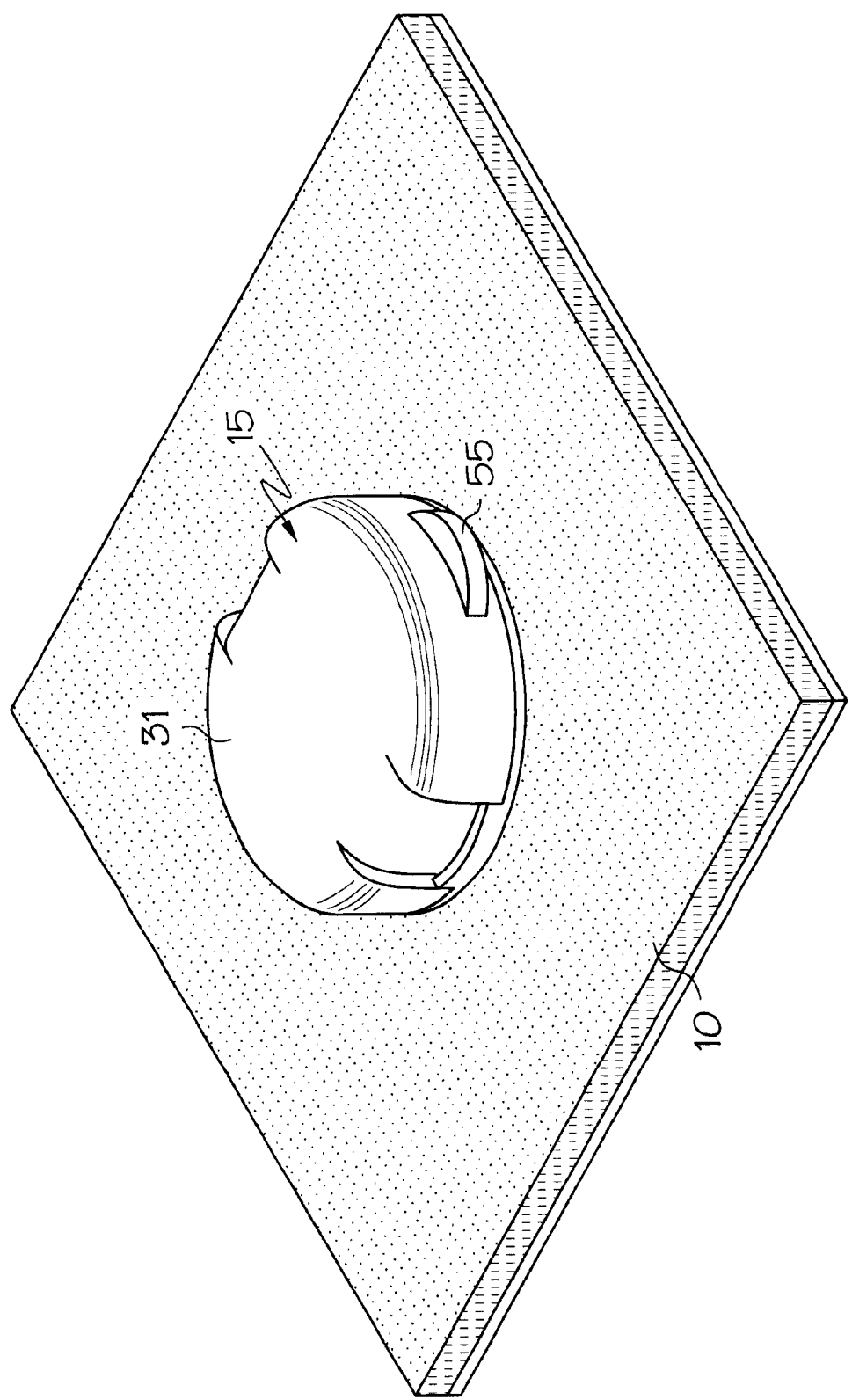
FIG. 2 is a perspective view of the two piece retainer assembly of FIG. 1 showing its cap in a closed position.

In accord with this invention, a two piece retainer assembly 15 is positioned in the hole of the floor mat 10 and permanently secured to it. It operates in association with the hook-like fastener 11. As shown in FIG. 1, the two piece retainer assembly 15 with is associated floor mat 10 is positioned onto the hook-like fastener 11. It is shown in an intermediate position. As depicted in FIG. 2, the two piece retainer assembly is in a locked position which securely holds the floor mat to the hook-like fastener to prevent any significant lateral sliding of the floor mat. As readily apparent from FIG. 2, the two piece retainer assembly in the locked position has a low profile and does not itself interfere with use of the vehicle.

Figure 3:
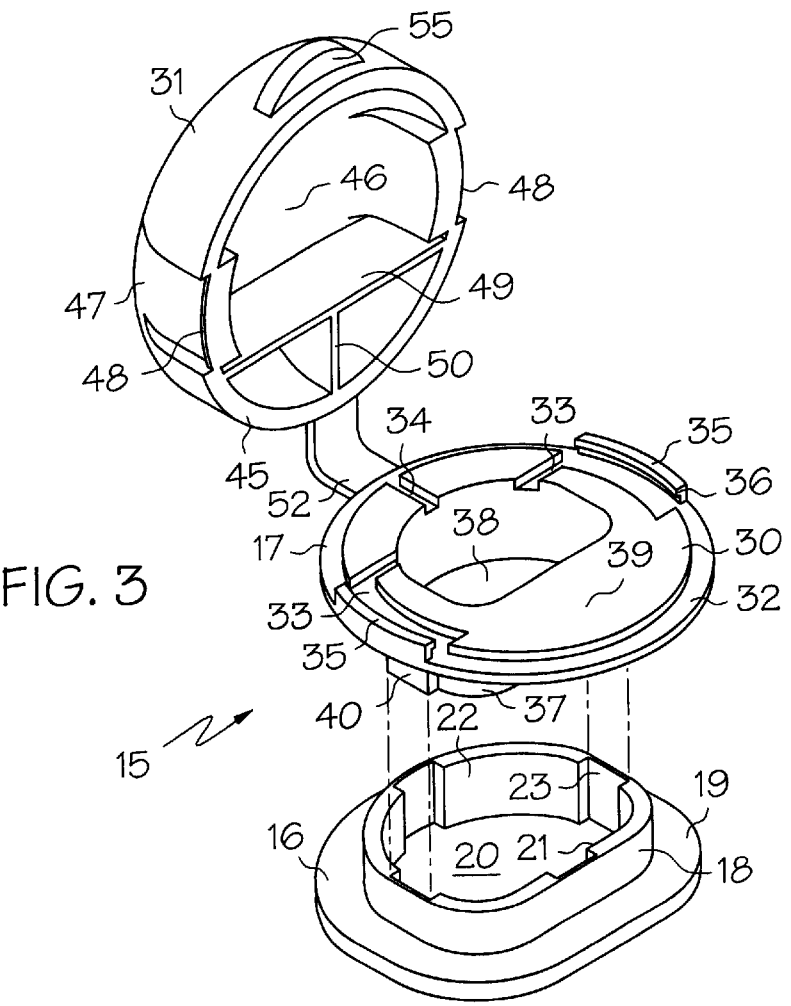
FIG. 3 is a perspective exploded view of the two piece retainer assembly of FIG. 1 in isolation.
Figure 4:
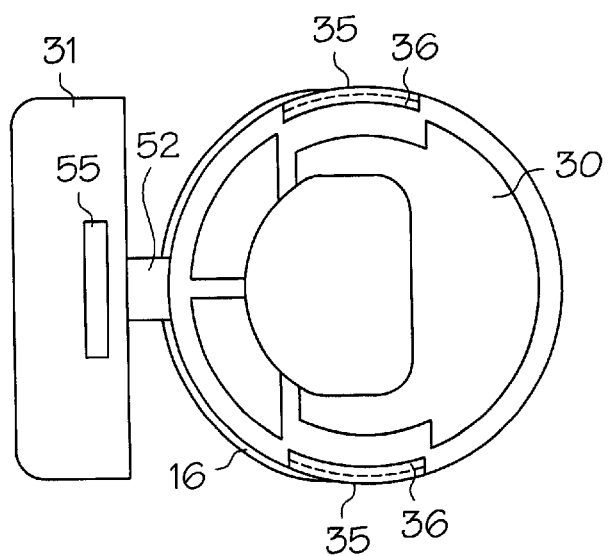
FIG. 4 is a top plan view of the two piece assembly of FIG. 3.

As best seen in FIG. 3, the retainer assembly 15 of the invention has two pieces which are assembled on the floor mat to form an operable retention means which works in conjunction with the hook-like fastener on the vehicle's floor surface. The two piece retention assembly 15 comprises an annular collar 16 and a locking cover coupler 17. FIG. 4 shows the annular collar 16 and the locking cover coupler 17 assembled together without the floor mat for illustration purposes only.

The annular collar 16 of the two piece retainer assembly 15 has a vertical upwardly extending wall 18 connected to a horizontal radially extending flange 19. As evident, the flange 19 extends from a lower terminus of the wall 18. The wall 18 and the flange 19 are integral, preferably molded as one piece. The wall 18 and flange 19 could as well be manufactured separately and permanently secured together. The vertical upwardly extending wall 18 forms an opening 20 for receiving the hook-like fastener 11. The wall 18 is continuous to form the closed opening 20. The wall 18 as depicted is generally D-shaped with a straight leg 21 and a curved leg 22 joined to terminuses of the straight leg. The height of the wall 18 is sufficiently high to accommodate the carpet thickness of the floor mat 10.

Other shaped walls on the annular collar are feasible, including oval and round shapes. The shape and size of the opening formed by the vertical upwardly extending wall is determined in part by the degree of floor mat movement which can be tolerated. For example, the opening can be sized to receive the hook-like fastener with minimal clearance in order to achieve minimal floor mat movement.

Preferably, for assembly reasons, the vertical upwardly extending wall 18 has at least one guide keyway 23 extending from an upper edge of the vertical wall downwardly. For optimum assembly reasons, the wall 18 has from two to four substantially equi-spaced keyways 23.

The annular collar 16 also includes the horizontal radially extending flange 19. The flange extends outwardly from the vertical upwardly extending wall 18. It forms a lip to contact the underside of floor mat 10 and provides a means of holding the annular collar 16 in proper position within the hole in the floor mat.

Still with reference to FIG. 3, the two piece retainer assembly 15 also includes the locking cover coupler 17. The coupler 17 has a base plate 30 hinged to a cap 31. The base plate is substantially flat with a top side and a bottom side. For appearance reasons, it is preferably generally circular. Recessed lands 32 extend around the periphery of the top side of the base plate 30 to accommodate the cap as further discussed below. It also has recessed lands 33 and 34 extending across the base plate's upper surface and also for the purpose to accommodate the cap. The base plate further has a set of latching tabs 35 extending vertically from the base plate's upper surface. As shown, the latching tabs 35 are opposed one another, though need not be. Each latching tab 35 includes a horizontal inwardly projecting ridge 36 at the latching tab's free end.

A vertical downwardly extending wall 37 extends from the bottom side of the base plate 30. The wall 37 is a continuous wall which forms an opening 38. The wall 37 makes frictional contact with the vertical upwardly extending wall 18 of the annular collar 16. When the vertical upwardly extending wall 18 of the annular collar 16 is generally D-shape, the vertical downwardly extending wall 37 will necessarily also be generally D-shape. As apparent from the opening 38 in the base plate 30, the generally D-shaped vertical downwardly extending wall 37 is off-center. This creates a substantially flat platform 39 on the base plate 30. A vertically extending leg of the hook-like fastener 11 abuts against a straight leg of the D-shaped vertical downwardly extending wall 37 and the horizontally extending leg of the hook-like fastener 11 abuts against the substantially flat platform 39 for secure retention during use.

The wall 37 preferably fits within the wall 18, though can also be sized to encompass the wall 18. The wall 37 accordingly has the same configuration as the wall 18 and is sized slightly less for the preferred embodiment. In either embodiment, the vertical upwardly extending wall 18 of the annular collar 16 and the vertical downwardly extending wall 37 of the locking cover coupler 17 are configured to fit into the floor mat hole and mate in frictional engagement to form a permanent retainer assembly on the floor mat.

When the vertical wall 18 of the annular collar 16 has guide keyways 23, the vertical upwardly extending wall 18 of the base plate 30 has aligned guide keys 40. The keys 40 are equal in number and size to engage the keyways 23 of the wall 18.

The cap provides several important functions. When closed, it causes a locking wall to engage the hook-like fastener 11 extending through the opening 38 in the base plate to prevent movement of the floor mat 10. The cap also seals off the underlying floor mat hole, thereby preventing water and debris from getting to the vehicle's floor surface. Further, the cap provides a smooth top surface as seen in FIG. 2 which is visually acceptable and can have a decorative value. It gives the retainer assembly a low profile, both enhancing the retainer assembly 15 functionally by lessening any driver interference and aesthetically by adding a finished appearance.

The cap is formed by a continuous wall 45 and a smooth flat surface 46 overlying the continuous wall. The continuous wall 45 is preferably generally circular and configured to substantially fully overlie the base plate 30. The wall 45 of the cap has two recessed slots 47 on an outer surface to receive the latching tabs. Each slot 47 includes a horizontal outwardly projecting ridge 48. The projecting ridges 48 receive the projecting ridges 36 on the latching tabs 35 and temporarily hold the cap to the base plate 30 when closed together. The cap also has an interior locking wall 49 extending across the hollow interior of the cap. It is positioned to contact the hook-like fastener when the cap is closed and frictionally hold the locking wall 49 to the hook-like fastener 11. This effectively provides positive retention of the floor mat to the vehicle's floor. A support wall 50 extends at a substantial right angle from a mid-section of the locking wall 49 to the exterior continuous wall 45 to add strength to the locking wall 49. As apparent from FIG. 2, the recess lands 32, 33 and 34 of the base plate 30 receive the walls of the cap 31 so that the cap sits flush on the base plate 30.

The base plate 30 and cap 31 are hinged together by a living hinge 52. Preferably, the locking cover coupler is molded as one piece with the living hinge 52 a part thereof. Alternatively, the base plate 30 and the cap 31 can be separate components which are optionally hinged together.

As most evident in FIG. 2, the cap also includes a pull tab 55 extending from the wall. The pull tab 55 is to facilitate opening of the cap.

In use, initially the annular collar of the two piece retainer assembly is positioned in a hole of the floor mat on the mat's underside. The locking cover coupler is then positioned on the top side of the floor mat's hole and the two pieces forced together until securely connected. The floor mat can now be slipped over the hook-like fastener in the floor of the vehicle and the floor mat straightened to lay properly on the floor. Closing the cap by forcing it downwardly forces the locking wall to engage the hook-like fastener. The floor mat is now secured in place. It can subsequently be released from the hook-like fastener for cleaning or replacement purposes simply by raising the cap to release the cap's locking wall from engagement with the fastener.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

We claim:

1. A two piece retainer assembly for permanent attachment to a floor mat for interacting with a hook-like fastener attached to a floor of a vehicle to positively retain the floor mat in place during use and for releasing the floor mat from the hook-like fastener for periodic removal from the vehicle, said two piece retainer assembly comprising:

(a) an annular collar for placement on an underside of the floor mat to extend into a hole in the floor mat, said annular collar having a vertical upwardly extending wall forming an opening for receiving the hook-like fastener and a horizontal radially extending flange connected to the vertical upwardly extending generally circular wall; and (b) a locking cover coupler for mating with the annular collar, said locking cover coupler having (i) a base plate with a top side and a bottom side and having a vertical downwardly extending wall forming an opening for receiving the hook-like fastener and further dimensioned to frictionally engage the vertical upwardly extending wall of the annular collar, and further having at least two vertically extending latching tabs extending from the top side thereof and (ii) a cap hinged to the base plate, said cap having a hollow interior formed by an exterior wall, further said cap having at least two recessed slots on its outer surface to interact with the latching tabs of the base plate and a locking wall extending across the hollow interior wall of the cap to frictionally engage the hook-like fastener in the vehicle's floor during use, whereby closing the cap of the locking cover coupler causes the locking wall to frictionally engage the hook-like fastener and to frictionally engage the latching tabs of the annular collar to positively retain the floor mat while opening the cap frees the floor mat from the hook-like fastener for removal therefrom.

2. The two piece retainer of claim 1 wherein the base plate of the locking cover coupler further has recessed landings extending around a periphery and across a mid-section of said base plate for receiving the exterior wall and the locking wall of the cap.

3. The two piece retainer of claim 2 wherein each latching tab of the base plate has an inwardly projecting ridge and each recessed slot of the cap has an outwardly projecting ridge for frictional engagement to retain said cap in place.

4. The two piece retainer of claim 3 wherein the vertical upwardly extending wall of the annular collar has a slightly greater cross dimension than the vertical downwardly extending wall of the base plate to receive said vertical downwardly extending wall of the base plate in friction engagement.

5. The two piece retainer of claim 1 wherein the vertical upwardly extending wall of the annular collar and the vertical downwardly extending wall of the base plate are both generally D-shaped.

6. The two piece retainer of claim 5 wherein the generally D-shaped vertical downwardly extending wall of the base plate is off-center for forming a substantially flat platform whereby the hook-like fastener in use has a vertically extending leg which abuts against a straight leg of the D-shaped vertical downwardly extending wall and further whereby the hook-like fastener has a horizontally extending leg which abuts against the substantially flat platform of the base plate.

7. The two piece retainer of claim 1 wherein the vertical upwardly extending wall of the annular collar has at least one vertical guide keyway and the vertical downwardly extending wall of the base plate has at least one aligned vertical guide key for proper positioning of the locking cover coupler in the annular collar.

8. The two piece retainer of claim 7 wherein the vertical upwardly extending wall of the annular collar has from two to four equi-spaced guide keyways and the vertical downwardly extending wall of the base plate has an equal number of equi-spaced aligned guide keys.

9. The two piece retainer of claim 1 wherein the base plate and the cap of the locking cover coupler are hinged together by a living hinge.

10. A two piece retainer assembly for permanent attachment to a floor mat for interacting with a hook-like fastener attached to a floor of a vehicle for positive retention of the floor mat during use and for releasing the floor mat from the hook-like fastener for periodic removal from the vehicle, said two piece retainer assembly comprising:

(a) an annular collar for placement on an underside of the floor mat to extend into a hole in the floor mat, said annular collar having a vertical upwardly extending wall forming an opening for receiving the hook-like fastener and a horizontal radially extending flange connected to the vertical upwardly extending generally circular wall; and (b) a locking cover coupler for mating with the annular collar, said locking cover coupler having (i) a base plate having a top side and a bottom side with a vertical downwardly extending wall forming an opening for receiving the hook-like fastener and further dimensioned to frictionally engage the vertical upwardly extending wall of the annular collar, and having two opposed vertically extending latching tabs extending from the top side thereof and (ii) a cap hinged to the base plate for semi-permanently engaging the base plate, said cap having a hollow interior formed by an exterior wall, further said cap having at least two recessed slots on its outer surface to interact with the latching tabs of the base plate and a locking wall extending across the hollow interior wall of the cap to frictionally engage the hook-like fastener in the vehicle's floor during use and further said cap having a pull tab extending outwardly for releasing the cap from the base plate and freeing the floor mat from friction engagement with the hook-like fastener.

11. The two piece retainer of claim 10 wherein the base plate of the locking cover coupler further has recessed landings extending around a periphery and across a mid-section of said base plate for receiving the exterior wall and the locking wall of the cap.

12. The two piece retainer of claim 11 wherein each latching tab of the base plate has an inwardly projecting ridge and each recessed slot of the cap has an outwardly projecting ridge to frictionally engage each inwardly extending ridge of each latching tab to retain said cap in place.

13. The two piece retainer of claim 10 wherein the vertical upwardly extending wall of the annular collar has a slightly greater cross dimension than the vertical downwardly extending wall of the base plate to receive said vertical downwardly extending wall of the base plate in friction engagement.

14. The two piece retainer of claim 13 wherein the vertical upwardly extending wall of the annular collar has at least one vertical guide keyway and the vertical downwardly extending wall of the base plate has at least one aligned vertical guide key for proper positioning of the base plate of the locking cover coupler in the annular collar.

15. The two piece retainer of claim 10 wherein the vertical upwardly extending wall of the annular collar has from two to four equi-spaced guide keyways and the vertical downwardly extending wall of the base plate has an equal number of equi-spaced aligned guide keys.

16. The two piece retainer of claim 10 wherein the openings in the annular collar and the base plate are generally D-shaped and off-center for forming a substantially flat platform on the base plate for receiving the hook-like fastener.

17. The two piece retainer of claim 10 wherein the base plate and the cap of the locking cover coupler are hinged together by a living hinge.

* * * * *